DOCUMENT READING HEAD UTILIZING A CYLINDRICAL LENS AND A PLURALITY OF BAFFLES TO MINIMIZE CROSSTALK BETWEEN CHANNELS

Filed July 22, 1968

INVENTOR:

LESLIE JOHN STREET

BY: Norris & Bateman

ATTYS.

United States Patent Office 3,523,191
Patented Aug. 4, 1970

3,523,191
DOCUMENT READING HEAD UTILIZING A CYLINDRICAL LENS AND A PLURALITY OF BAFFLES TO MINIMIZE CROSSTALK BETWEEN CHANNELS

Leslie John Street, Bristol, England, assignor to Parnall & Sons Limited, Soho Foundry, Birmingham, England

Filed July 22, 1968, Ser. No. 746,486
Claims priority, application Great Britain, Aug. 9, 1967, 36,499/67
Int. Cl. G06k *7/00*
U.S. Cl. 250—219 5 Claims

ABSTRACT OF THE DISCLOSURE

A document reading head having minimal "crosstalk" and comprising a cylindrical lens, a plurality of substantially flat screens extending in parallel spaced apart planes substantially perpendicular to the longitudinal axis of the lens, and a plurality of light responsive transducers disposed between respective adjacent pairs of screens.

This invention relates to reading heads for automatic document reading apparatus and has for its principal object substantially to reduce the occurrence of "crosstalk" between adjacent members of a group of light sensitive reading cells, and also to facilitate the manufacture and setting up of such reading heads.

The invention consists of an automatic document reading head comprising a cylindrical lens, a plurality of substantially flat screens extending in parallel spaced apart planes substantially perpendicular to the longitudinal axis of the lens, and a plurality of light responsive transducers disposed between respective adjacent pairs of screens.

Figure 1:
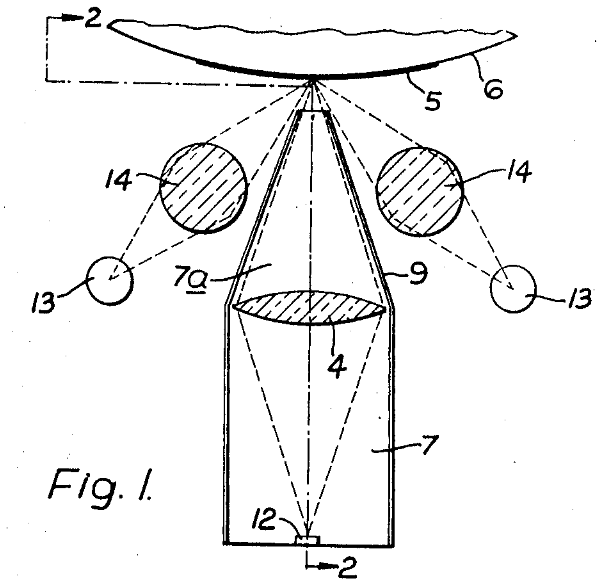
Figure 2:
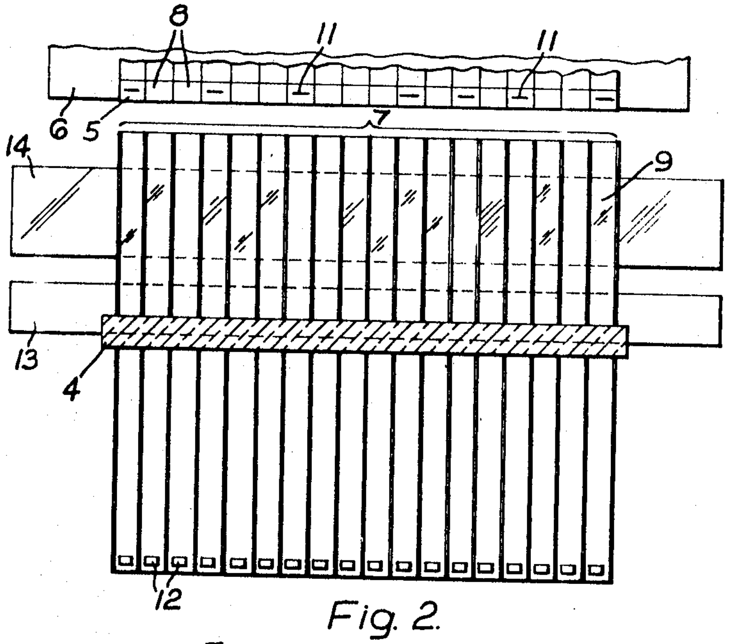
Figure 3:
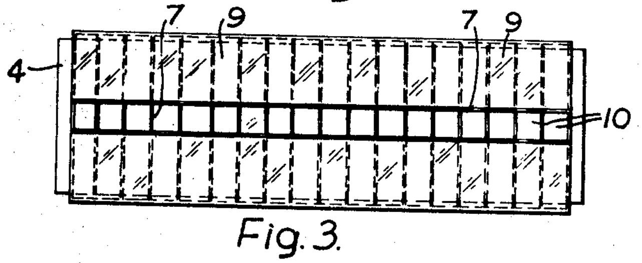

One example of the practical realisation of the invention is illustrated in the accompanying drawings wherein:

FIG. 1 is a schematic side elevation of a document reading apparatus incorporating a reading head according to the invention, FIG. 2 is a cross-section on the line 2—2 of FIG. 1, and FIG. 3 is a plan view of the reading head of FIGS. 1 and 2.

Referring to the drawings the improved document reading head comprises a cylindrical lens 4 of bi-convex cross section and of length sufficient to span the information containing width of a document 5 carried by a drum 6 for automatic reading by the head. A plurality of like screens 7 are each composed of flat metal plates having an aperture for receiving the cross section of the lens 4. The screens are blackened to reduce unwanted reflections and on the side of the lens nearer the drum terminate in generally triangular portions 7*a* whose apices are dimensioned for positioning between the mark containing spaces 8 along an information line of the document. The screens 7 are secured in their spaced apart parallel planes by a shroud 9 covering the two inclined edges of the triangular parts 7*a* of the screens 7 so as to define rectangular windows 10 at the apices for receiving reflected light from marks 11 in the spaces 8 of a document disposed in a plane normal to the screens whilst shielding the space between the screens from extraneous light.

As best shown in FIG. 2, the spacing between the screens 7 essentially correspond with the spacing between the mark positions on the document information lines and the planes of the screens are all disposed at right angles to the longitudinal axis of the lens 4. Light sensitive reading cells 12 are positioned one between each adjacent pair of screens on the opposite side of the lens 4 to the windows 10 defined between the apices of the screens.

Conveniently the light proceeding from the document spaces 8 is derived from a pair of strip light sources 13 focused on the line of spaces by respective cylindrical condenser lens 14 all symmetrically disposed with respect to the reading head.

The principal advantage of the above described reading head lies in its almost complete elimination of "crosstalk" between the responses of the various cells 12 to mark signals received through the windows 10 between their respective pairs of screens 7, whilst utilising a single lens 4 which greatly facilitates the ease of assembly and setting up of the head. Another significant advantage is that the present head permits successful use of a cylindrical lens so that the read head is more sensitive to line markings lying parallel to the longitudinal axis of the lens as compared with its lower sensitivity to otherwise and randomly orientated marks because the former marks are preferentially focused by the lens.

I claim:

1. A reading head comprising a plurality of light-responsive transrucers and a cylindrical lens, for focusing document mark images on respective transducers, characterised by a plurality of substantially flat screens (7) extending in parallel spaced apart planes substantially perpendicular to the longitudinal axis of the lens (4) with the plurality of light-responsive transducers (12) disposed between respective adjacent pairs of screens.

2. A reading head according to claim 1 characterised in that the lens (4) extends through apertures in the screens (7).

3. A reading head according to claim 1 characterized by a shroud (9) covering the screens (7) except for windows (10) defined one between each pair of screens, said windows and transducers (12) being disposed on the optical axis of the lens (4) on respective sides of said axis.

4. A reading head according to claim 3 characterized in that the windows (10) are of the same shape and size.

5. A reading head according to claim 3 characterized in that the screens (7) have triangular parts (7*a*) extending from the same side of the lens with said windows defined at the apices of the triangular parts.

References Cited

UNITED STATES PATENTS

| | | | |
|---|---|---|---|
| 2,916,624 | 12/1959 | Angel et al. | 250—219 |
| 3,424,914 | 1/1969 | Wilson | 250—219 |

WILLIAM F. LINDQUIST, Primary Examiner
T. N. GRIGSBY, Assistant Examiner

U.S. Cl. X.R.

235—61.115; 250—237